(No Model.)  2 Sheets—Sheet 1.

S. M. TRAPP.
REGENERATING FURNACE.

No. 523,088.  Patented July 17, 1894.

Witnesses:
G. L. Cragg
George S. Buell

Inventor:
Samuel M. Trapp
by Barton & Brown
attorneys.

(No Model.) 2 Sheets—Sheet 2.

S. M. TRAPP.
REGENERATING FURNACE.

No. 523,088. Patented July 17, 1894.

Witnesses:
George L. Cragg
George S. Buell

Inventor:
Samuel M. Trapp
By Barton & Brown
Attorneys

UNITED STATES PATENT OFFICE.

SAMUEL M. TRAPP, OF CHICAGO, ILLINOIS, ASSIGNOR, BY DIRECT AND MESNE ASSIGNMENTS, TO THE DONAU-TRAPP CLIMAX GAS PRODUCER COMPANY, OF SAME PLACE.

REGENERATING-FURNACE.

SPECIFICATION forming part of Letters Patent No. 523,088, dated July 17, 1894.

Application filed March 9, 1894. Serial No. 503,029. (No model.)

*To all whom it may concern:*

Be it known that I, SAMUEL M. TRAPP, a citizen of the United States, residing at Chicago, in the county of Cook and State of Illinois, have invented a certain new and useful Improvement in Regenerating-Furnaces, (Case No. 1,) of which the following is a full, clear, concise, and exact description, reference being had to the accompanying drawings, forming a part of this specification.

My invention relates to regenerating furnaces, and its object is to readily and economically manufacture for regenerating furnaces gas from steam and oil, and in a manner to utilize in the process the heat of heretofore waste products of combustion.

Heretofore, gas has been produced by passing mixed steam and oil through a highly heated checkerwork of refractory material, sufficient heat being thereby imparted to the mixture to decompose the steam and oil into their constituent elements and cause the same to re-unite to form a fixed gas.

My invention herein contemplates the utilization in this process of the heat of heretofore waste gases of combustion from a source of heat supply, as a furnace, by causing such heat to assist in the decomposition of the oil and steam. To accomplish this the steam is passed through a super-heater comprising a tortuous passage located in heat conductive relation to the gases of combustion, the steam thus absorbing heat from such gases and becoming highly super-heated. The steam, thus super-heated, is ejected into a mixing chamber where it comes in contact and is thoroughly intermingled with the oil. The intermixed oil and gas are passed through the checkerwork of highly heated refractory material and absorb sufficient heat, additional to that absorbed by the steam from the waste gases of combustion, to cause the decomposition of the super-heated steam and of the oil, which then combine to form a fixed gas.

My invention will be more readily understood by reference to the accompanying drawings, in which—

Figure 1:
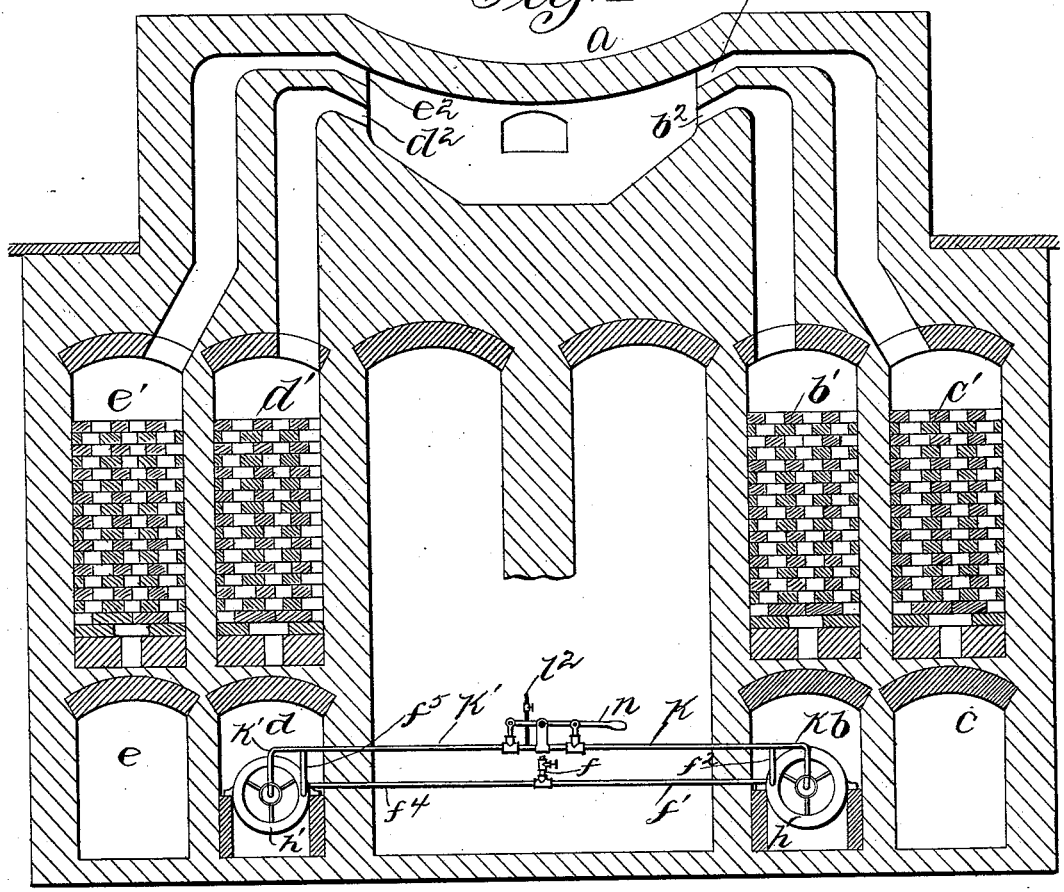
Figure 2:
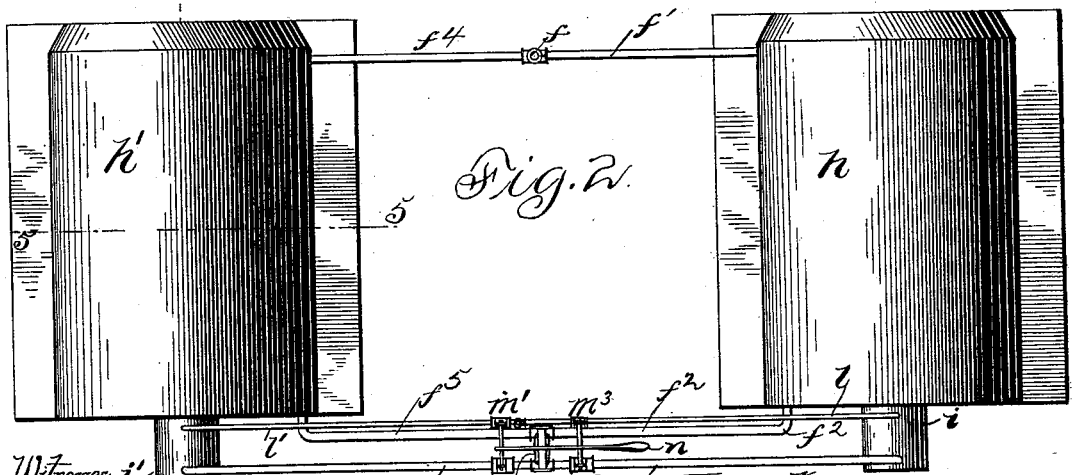
Figure 3:
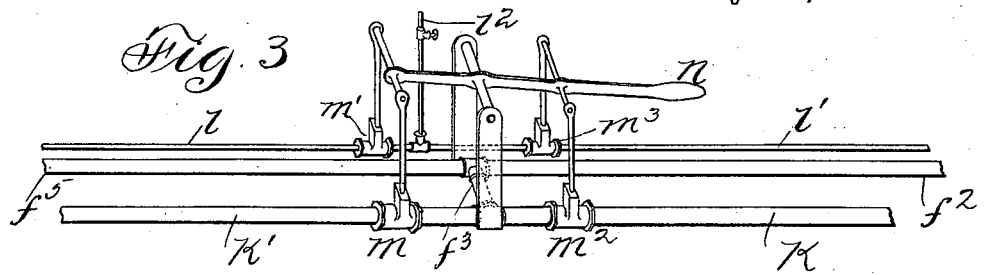
Figure 4:
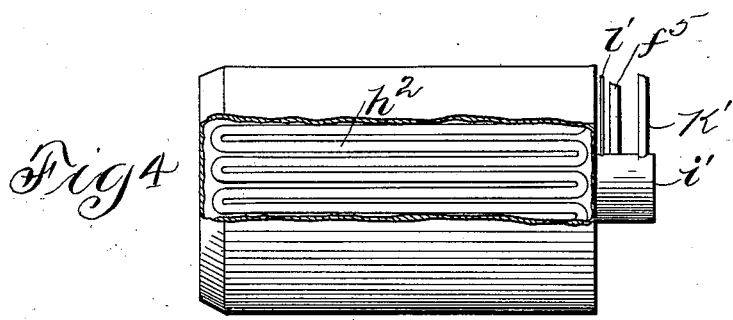
Figure 5:
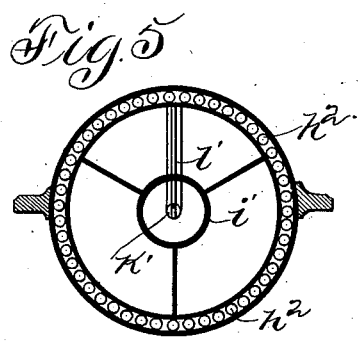
Figure 6:
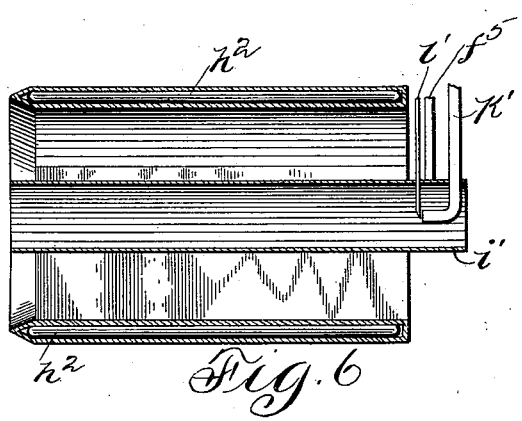

Figure 1 is an elevational view partially in section of a regenerating furnace equipped after the manner of my invention. Fig. 2 is a plan view of the super-heaters and the steam and oil passages arranged in accordance with my invention. Fig. 3 is an isometric view of the oil and steam pipes and the valve and operating mechanism. Fig. 4 is a view of one of the super-heaters, the cover being partially broken away. Fig. 5 is a sectional view on line 5—5, Fig. 2. Fig. 6 is a longitudinal sectional view of the super-heater on line 6—6, Fig. 2.

Like letters refer to like parts in the several figures.

I have illustrated my invention as applied to the well known Siemens type of regenerative furnace, it being understood that it may be applied to any form of furnace, or in any place where waste gases of combustion are available.

The Siemens furnace as usually constructed comprises a hearth $a$ which contains the molten metal to which the heat is to be applied. Gas, from a gas reservoir, or generating furnace, is conveyed by the flue $b$ through a checkerwork of refractory material $b'$, which serves to super-heat the gas, the gas then passing through outlet $b^2$ where it comes in contact with air issuing from the outlet $c^2$, the air having been admitted through the flue $c$ and heated in passing through the highly heated refractory material $c'$. The gas being ignited combines combustively with the oxygen of the air to produce a high heat within the hearth. The products of combustion pass through the outlets $d^2$ $e^2$, a part through each and come in contact with the refractory material $d'$ $e'$, which they heat in passing therethrough, the products of combustion then passing into the flues $d$ and $e$, and then out the smoke stack with which said flues are in communication. Thus the only portion of the waste gases of combustion utilized is that necessary to heat the refractory material, the remainder passing up the smoke stack and escaping un-utilized. A run having continued thus twenty to thirty minutes, the gas supply is cut off from flue $b$, said flue being now thrown into communication with the smoke stack, as is also the flue $c$, which before has been in communication with the external air. Flues $d$ and $e$ are disconnected from the smoke stack and flue $d$ connected with the supply of gas, while flue $e$ is thrown open to the external air. The gas now passes through the checkerwork $d'$ and issues from the outlet $d^2$ where it comes in contact and combines combustively with the hot air from outlet $e^2$. The waste gases of combustion pass by outlets $b^2$ and $c^2$ through the refractory material $b'$ $c'$ and then out the stack. Thus is heated during each run the refractory material which on the next succeeding run is to super-heat the gas and heat the air, the heat being derived from the waste products of combustion as they pass to the smoke stack. By my invention I am enabled to utilize these waste products of combustion in the production of the gas itself, and thus utilize a considerable portion of heat energy that has heretofore been wasted; and, furthermore, instead of providing an external supply of gas I am enenabled to produce the gas within the furnace, and directly in proportion as it may be desired to be used. To accomplish this, I place in the flues $b$ and $d$ super-heaters $h$ $h'$ comprising steam pipes of considerable length through which the steam may pass before coming in contact with the oil, thus absorbing heat from the waste products of combustion as they pass through the flues.

In order to provide considerable length of pipe within a small space, and so disposed that the heat may readily find access thereto, I provide a number of sections of pipe $h^2$ placed parallel and located about a central axis, the ends of the sections being consecutively joined to form a continuous but tortuous passage for the steam. One end of the super-heater $h$ is connected with a steam supply pipe $f$ by means of a pipe $f'$, while the other end is connected by means of a pipe $f^2$ with a pipe $f^3$. Likewise the super-heater $h'$ located in the opposite flue is connected by pipes $f^4$ and $f^5$ with the pipes $f$ and $f^3$ respectively.

Located within the super-heaters are hollow cylinders or mixing chambers $i$ $i'$, into the ends of which extend respectively the pipes $k$ $k'$ which are connected with the central steam pipe $f^3$.

Opposite the ends of the pipes $k$ $k'$ are located respectively the ends of the oil pipes $l$ $l'$ which are in communication with an oil supply pipe $l^2$ connected with an oil reservoir.

The ends of the oil pipes $l$ $l'$ are made oblique, as shown more clearly in Fig. 6, and the steam jet directed against the longer side of the pipe thus creating a suction which causes the oil to flow from the pipe in a steady stream.

In the steam pipes $k$ $k'$, as well as in the oil pipes $l$ $l'$, are placed valves $m$ $m'$ $m^2$, $m^3$, by means of which the passage of the steam or oil through the respective pipes may be restricted or prevented.

As it is desired to make gas in but one flue at a time, and, consequently, it is necessary to cause a flow of the steam and oil only on one side, the valve stems may be connected with a rocking arm $n$ so that when the arm is in one position the valves $m$ and $m'$ are closed, while the valves $m^2$ and $m^3$ are open, and vice versa.

The operation is as follows: Suppose flues $d$ and $e$ open to the stack, flue $b$ closed so that no air can enter, and flue $c$ open to the atmosphere. Steam from any suitable source of supply is admitted through the pipe $f$ and passes by pipes $f'$ and $f^4$ through the super-heaters $h$ and $h'$, absorbing heat and becoming super-heated. The steam then passes by pipes $f^2$ and $f^5$ to the central pipe $f^3$. As gas is to be made in the right hand side of the furnace the valves $m^2$ and $m^3$ are opened and the valves $m$ and $m'$ closed. The steam from the two super-heaters thus finds passage to the pipe $k$ and thence to the hollow cylinder $i$, where it comes in contact and is mingled with oil issuing from pipe $l$. The intermingled oil and super-heated steam pass upward where they come in contact with the highly heated refractory material $b'$ and are decomposed into their respective elements and caused to re-unite to form a fixed gas, which, passing out the outlet $b^2$, comes in contact and combines combustively with the heated air issuing from outlet $c^2$. The products of combustion pass through the outlets $d^2$ $e^2$ and in their passage to the smoke stack heat the refractory material $d'$ $e'$, and also come in contact with super-heater $h'$. During this run the heat absorbed by the super-heater $h$ will be such as may remain within the walls of the flue $b$. A run having continued thus for twenty to thirty minutes, the handle $n$ is manipulated, thus closing the valves $m^2$ and $m^3$ and opening valves $m$ and $m'$, thus causing the flow of steam and oil into the cylinder $i'$ in the flue $d$, the moisture passing upward through the checkerwork $d'$ to form a fixed gas which issues from outlet $d^2$ and combines combustively with heated air from outlet $e^2$. The products of combustion pass through outlets $b^2$ $c^2$ and heat the refractory material $b'$ $c'$ and the super-heater $h$.

It will be observed that during each gas run both super-heaters are supplying steam for the manufacture of the gas, one super-heater being located in the flue through which the waste products of combustion are passing on their way to the smoke stack, while the other super-heater is in a chamber sealed from the stack and the atmosphere, but which contains considerable heat as the waste products of combustion have been just previously passing therethrough. In this manner, I am enabled to utilize in the manufacture of the gas a considerable portion of the heat of the waste gases of combustion.

The pipes comprising the super-heater may with advantage be covered with metal to present a smooth surface that may prevent the lodgment of soot between the pipes, and the consequent impairment of their heat conductivity. Furthermore, the central cylinders within which the steam and oil are mixed being located in the line of travel of the waste gases and open at both ends, permits the ready passage therethrough of the waste products, and the carbon that tends to cake upon its inner surface is thus removed.

It is obvious that my invention may be applied to other furnaces with the necessary changes to meet the peculiar requirements, the super-heater being placed within the flue, through which the waste products to be utilized may be passing, while the mixing cylinder is placed in any convenient position to direct the mixed steam and oil against a properly constructed checkerwork of refractory material.

It is evident that my invention is susceptible of modifications, and I do not therefore desire to limit myself to details of construction, but Having described my invention, what I claim as new, and desire to secure by Letters Patent, is—

In a regenerating furnace, the combination with a hearth, of regenerating chambers situated one on each side thereof, a flue leading from each of said chambers, a steam superheater situated in each of said flues, said superheaters being continuously in communication with a source of steam supply, each of said superheaters being in the form of an open ended hollow cylinder, the axis thereof lying in the line of travel of the escaping gases of combustion, a mixing chamber provided in each of said flues, said mixing chamber being in the form of a hollow open ended cylinder, the axis thereof lying in the line of travel of the escaping gases of combustion, a steam duct and an oil duct opening into each of said mixing chambers, said steam ducts being adapted to communicate with said superheaters, and valve mechanism for sealing one or the other of said flues and opening the steam and oil ducts leading thereto; whereby the passage of the escaping gases of combustion prevents the accumulation of carbon in the mixing chambers, or of soot and ashes on the superheaters, substantially as described.

In witness whereof I hereunto subscribe my name this 5th day of March, A. D. 1894.

SAMUEL M. TRAPP.

Witnesses:
ROBERT BARLOW,
GEORGE L. CRAGG.